US010242098B2

(12) United States Patent
Koenigstein et al.

(10) Patent No.: US 10,242,098 B2
(45) Date of Patent: Mar. 26, 2019

(54) HIERARCHICAL MULTISOURCE PLAYLIST GENERATION

(71) Applicant: Microsoft Technology Licensing, LLC, Redmond, WA (US)

(72) Inventors: Noam Koenigstein, Ra-anana (IL); Nir Nice, Kfar Veradim (IL); Shay Ben Elazar, Tel Aviv (IL); Yehiel Berezin, Petah Tikva (IL); Oren Barkan, Rishon Lezion (IL); Tal Zaccai, Tel Aviv (IL); Shimon Shlevich, Nazareth Illit (IL); Nimrod Ben Simhon, Netanya (IL); Paul Nogues, Clamart (FR); Gal Lavee, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 284 days.

(21) Appl. No.: 15/169,305

(22) Filed: May 31, 2016

(65) Prior Publication Data

US 2017/0344635 A1    Nov. 30, 2017

(51) Int. Cl.
 *G06F 17/30* (2006.01)
(52) U.S. Cl.
 CPC .. *G06F 17/30772* (2013.01); *G06F 17/30053* (2013.01); *G06F 17/30749* (2013.01)
(58) Field of Classification Search
 None
 See application file for complete search history.

(56) References Cited

U.S. PATENT DOCUMENTS

| | | |
|---|---|---|
| 7,196,258 B2 | 3/2007 | Platt |
| 7,313,571 B1 | 12/2007 | Platt et al. |
| 7,797,272 B2 | 9/2010 | Picker et al. |
| 8,175,989 B1 | 5/2012 | Gopinath et al. |
| 8,258,390 B1 | 9/2012 | Gossweiler et al. |
| 9,299,331 B1* | 3/2016 | Durham ............ G06F 17/30749 |
| 2005/0021470 A1* | 1/2005 | Martin ............. G06F 17/30749 705/51 |
| 2006/0206478 A1 | 9/2006 | Glaser et al. |

(Continued)

OTHER PUBLICATIONS

Shao, et al., "Music Recommendation Based on Acoustic Features and User Access Patterns", In Proceedings of IEEE Transactions on Audio, Speech, and Language Processing, vol. 17, Issue 8, Nov. 2009, pp. 1602-1611.

(Continued)

*Primary Examiner* — Tarek Chbouki
(74) *Attorney, Agent, or Firm* — Workman Nydegger

(57) ABSTRACT

A playlist generator that utilizes multiple data sources to rank each track within a set of candidate tracks to enable selection of candidate tracks according to the ranking. Candidate tracks are each scored according to one or more features, such as acoustic similarity and/or similar usage patterns of the candidate track or artist of the candidate track to a current or previously played track or artist. Each feature is weighted according to historical listening patterns surrounding a user-selected playlist seed artist. The weighting may also be further corrected according to historical listening patterns of the particular user. When historical usage data related to a particular seed artist is limited, more generalized historical usage data related to a higher level in a genre hierarchy may be used.

19 Claims, 6 Drawing Sheets

(56) References Cited

U.S. PATENT DOCUMENTS

| | | |
|---|---|---|
| 2009/0217804 A1 | 9/2009 | Lu et al. |
| 2011/0295843 A1 | 12/2011 | Ingrassia et al. |
| 2012/0233164 A1 | 9/2012 | Rowe et al. |
| 2012/0290621 A1 | 11/2012 | Heitz et al. |
| 2013/0311163 A1* | 11/2013 | Somekh .............. G06N 99/005 703/21 |

OTHER PUBLICATIONS

Gunawardana, et al., "A Unified Approach to Building Hybrid Recommender Systems", In Proceedings of the third ACM conference on Recommender systems, Oct. 2009, 8 pages.

Aalto, Erik, "Learning Playlist Representations for Automatic Playlist Generation", In Master Thesis of KTH Royal Institute of Technology, Retrieved on: Apr. 28, 2016, 67 pages.

Wang, et al., "Improving Content-based and Hybrid Music Recommendation using Deep Learning", In Proceedings of the 22nd ACM international conference on Multimedia, Nov. 3, 2014, pp. 627-636.

McFee, et al., "Learning content similarity for music recommendation", In Journals of LATEX Class Files, vol. 6, Issue 1, Jan. 2007, pp. 1-12.

Vall, Andreu, "Listener-Inspired Automated Music Playlist Generation", In Proceedings of the 9th ACM Conference on Recommender Systems, Sep. 16, 2015, pp. 387-390.

Chiarandini, et al., "A System for Dynamic Playlist Generation Driven by Multimodal Control Signals and Descriptors ", In Proceedings of IEEE 13th International Workshop on Multimedia Signal Processing, Oct. 17, 2011, 6 pages.

Correa, et al., "A Graph-Based Method for Playlist Generation", In Proceedings of 9th International Symposium on Computer Music Modelling and Retrieval, Jun. 19, 2012, pp. 466-473.

Flexer, et al., "Playlist Generation Using Start and End Songs", In Proceedings of 9th International Conference on Music Information Retrieval, Sep. 14, 2008, pp. 173-178.

Bonnin, et al: "Automated Generation of Music Playlists: Survey and Experiments", Nov. 12, 2014.

"International Search Report and the Written Opinion" issued in PCT Application No. PCT/US2017/033442 dated Aug. 17, 2017.

\* cited by examiner

HIERARCHICAL MULTISOURCE PLAYLIST GENERATION

BACKGROUND

The development of computers, computer networks, and particularly the Internet has greatly expanded the number of options for receiving audio content available to users. Unlike typical broadcast radio, where for any particular station the sequence of audio content is selected by a limited number of individuals before being broadcast at large, the Internet has enabled the streaming of audio content in a much more personalized manner. For example, a user may use an Internet-based audio service to create a personal station by providing a seed, such as an artist or track. The service will typically then attempt to provide audio selections that correspond to that seed.

Although such developments have been beneficial, various problems particular to Internet-based delivery of audio content persist. For example, user experience is hampered when audio selections are made that the user dislikes, is bored of, or otherwise finds unengaging. Further, opportunities are missed when audio selections that a user would have enjoyed are not made. Such problems may force users to manually skip disliked or overused tracks (likely interrupting other tasks) or may cause them to simply stop using the service altogether.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the use of a playlist generator configured to assemble, from a set of candidate tracks, a sequence of one or more tracks within a playlist. When a playlist seed is initially received, a set of candidate tracks is generated, and each candidate track is scored according to one or more features. The features are weighted according to seed-based training data (e.g., historical listening patterns of a plurality of users) associated with the particular playlist seed. In some embodiments, the features are additionally weighted according to user-based training data (e.g., historical listening patterns of the specific user).

In some embodiments, the playlist generator then uses the weighted feature scores to rank each candidate track in a ranked candidate track mapping/ranking. In some embodiments, the ranking includes converting the weighted feature scores of each candidate track into probability scores. The playlist may then be generated by traversing the mapping to select one or more candidate tracks to make up the playlist.

In some embodiments one or more selectivity parameters are applied to control the manner in which the one or more candidate tracks are selected from the ranked candidate track mapping. For example, a selectivity parameter may be applied to control the strictness or tightness by which the selection sequence adheres to the ranking/mapping of candidate tracks. In one example, a selectivity parameter is configured to control track selection within the mapping based on an exploratory/conservative continuum, such that a more exploratory setting enables selection of one or more candidate tracks located at relatively greater distances within the mapping (i.e., having relatively lower rank and/or probability score), while a more conservative setting tunes selection to one or more candidate tracks located relatively closer to the seed and/or previously played track (i.e., having relatively higher rank and/or probability score). A more "exploratory" setting provides more serendipity and discoverability, which are often desired traits of playlists; however, different users may desire different relative amounts of such playlists traits. In some embodiments, a selectivity parameter is tuned according to user-based training data and seed-based training data to provide an optimum level of at least one or discoverability, serendipity, or diversity to the generated playlist.

As candidate tracks are selected and played in a particular station, the playlist generation and track selection process may be iterated to generate additional tracks in the playing sequence. For example, in some embodiments a generated playlist may only be one track long or a few tracks long, such that the candidate track mapping is iteratively reconfigured at every track transition or every few track transitions based on a user's response to the selected candidate tracks (e.g., skipping, not skipping, or explicitly indicating a level of interest).

In some circumstances, a received playlist seed may have little or no seed-based training data directly associated with it. For example, a relatively new artist may not have been listened to long enough to enable the generation of any directly associated historical listening patterns. At least some embodiments described herein provide seed-based training data in these types of circumstances by utilizing a genre hierarchy having different hierarchy levels and different sets of seed-based training data corresponding to each hierarchy level.

For instance, in circumstances where an insufficient amount of historical data exists for a particular playlist seed, the genre hierarchy is traversed to progressively higher levels until a level is reached having sufficient historical data, and the usage/training data from that level is used to formulate the seed-based weighting of candidate track features. In some embodiments, as additional usage data is collected for the particular playlist seed, progressively higher proportions of the collaborative usage data used in the weighting operation may be sourced from lower hierarchy levels previously having insufficient training data.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
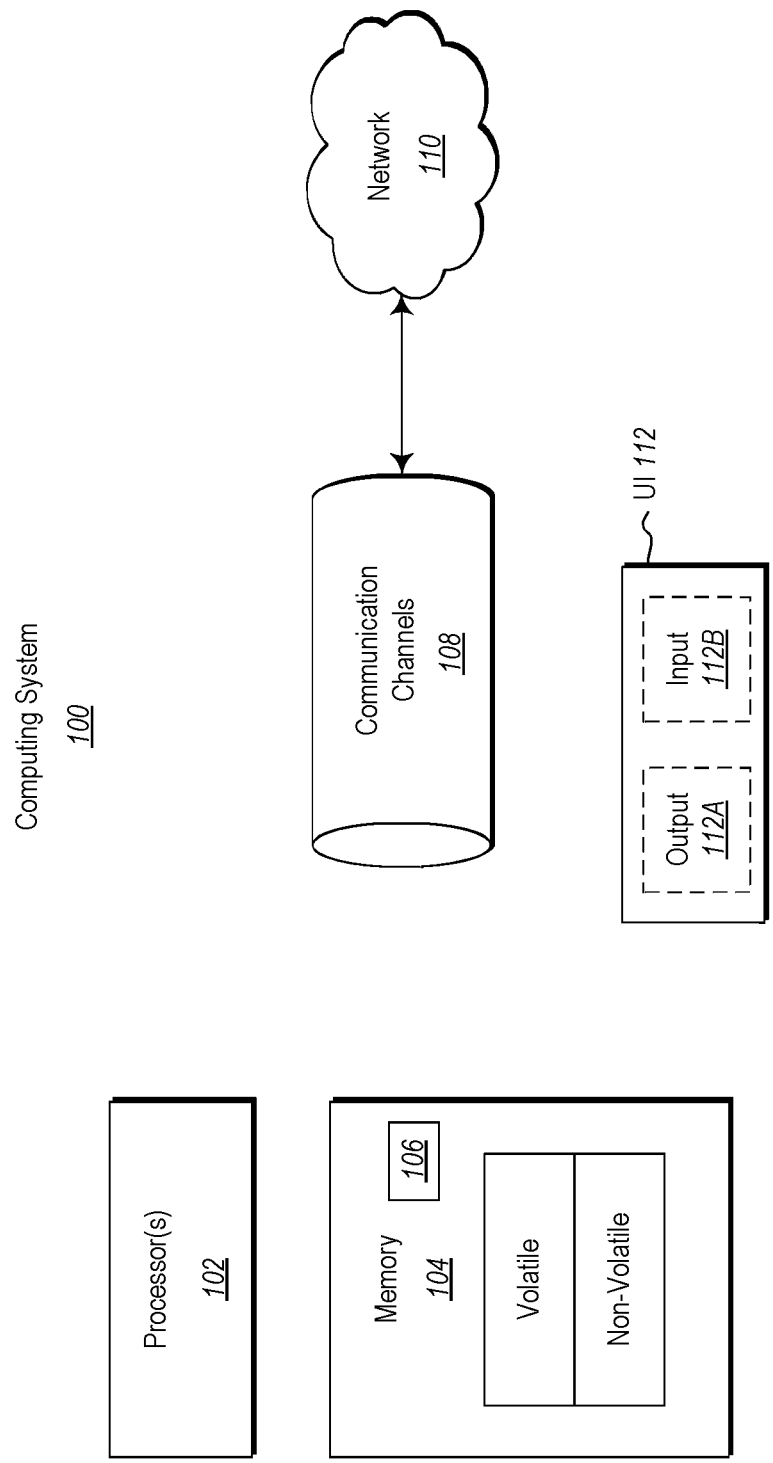
FIG. 1 illustrates an example computing system in which the principles described herein may be employed.

At least some embodiments described herein relate to the generation of one or more optimized playlists to enable improved user experience by providing beneficial solutions to playlist generation problems specifically arising in the context of Internet-based audio content delivery. For example, problems arising specifically in the Internet radio domain include the challenge of providing a suitable individualized playlist based on specified user input (e.g., a station seed) without focusing on the wrong features of potential playlist candidates. Additional challenges arising specifically in this context include providing a playlist that provides sufficient diversity, discoverability, and opportunity for serendipitous discovery without straying too far from user preferences, and without being overly repetitive or boring.

Another challenge arising in the context of Internet-based audio content delivery includes the balancing of multiple sources of indicative data. For example, given a particular playlist seed or currently playing track, candidate track selection may be based on similarities in acoustic properties (e.g., based on digital signal processing showing similarities between tracks, albums, and artists) and/or similarities in historical usage patterns (e.g., based on users' musical tastes as observed from a large dataset of usage patterns; i.e., collaborative filtering data). Overreliance on the former tends to miss many elements of a good listening experience, while overreliance on the latter tends to overly skew playlists toward popular tracks and artists and older tracks having more usage data.

A related challenge includes the handling of relatively new audio content. For example, a new artist, album, and/or track with limited associated usage data is difficult to incorporate into playlist generation schemes based on anything more than potential acoustic similarity metrics. Of course, a playlist generator may be tuned more toward such acoustic similarity measures in an attempt to capture a greater proportion of newer audio content, but doing so introduces the foregoing problems of overreliance on acoustic similarity, and fails to fully capture the real-world usage similarities of the new content likely to become apparent as time goes on.

At least some of the embodiments described herein address one or more of the foregoing challenges. Although the examples and the illustrated embodiments described herein are typically described in the context of generating audio track playlists, one of skill in the art will understand that the solutions and benefits described herein may also be applied to hierarchal multisource playlist generation in other Internet-based multimedia contexts where similar problems (e.g., of providing an individualized and enjoyable sequence of content selections) are advantageously addressed by the principles and concepts described herein. For example, some embodiments described herein may be utilized in the context of generating a video streaming queue or a non-musical audio playlist (e.g., audiobooks).

Some introductory discussion of a computing system will be described with respect to FIG. 1. Then, the operation of embodiments of a hierarchical and/or multisource playlist generator will be described with respect to FIGS. 2 through 6B.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine", "control" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality elements, and so forth. Examples of input mechanisms 112B might include, for instance, microphones, touchscreens, holograms, cameras, keyboards, mouse of other pointer input, sensors of any type, virtual reality elements, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
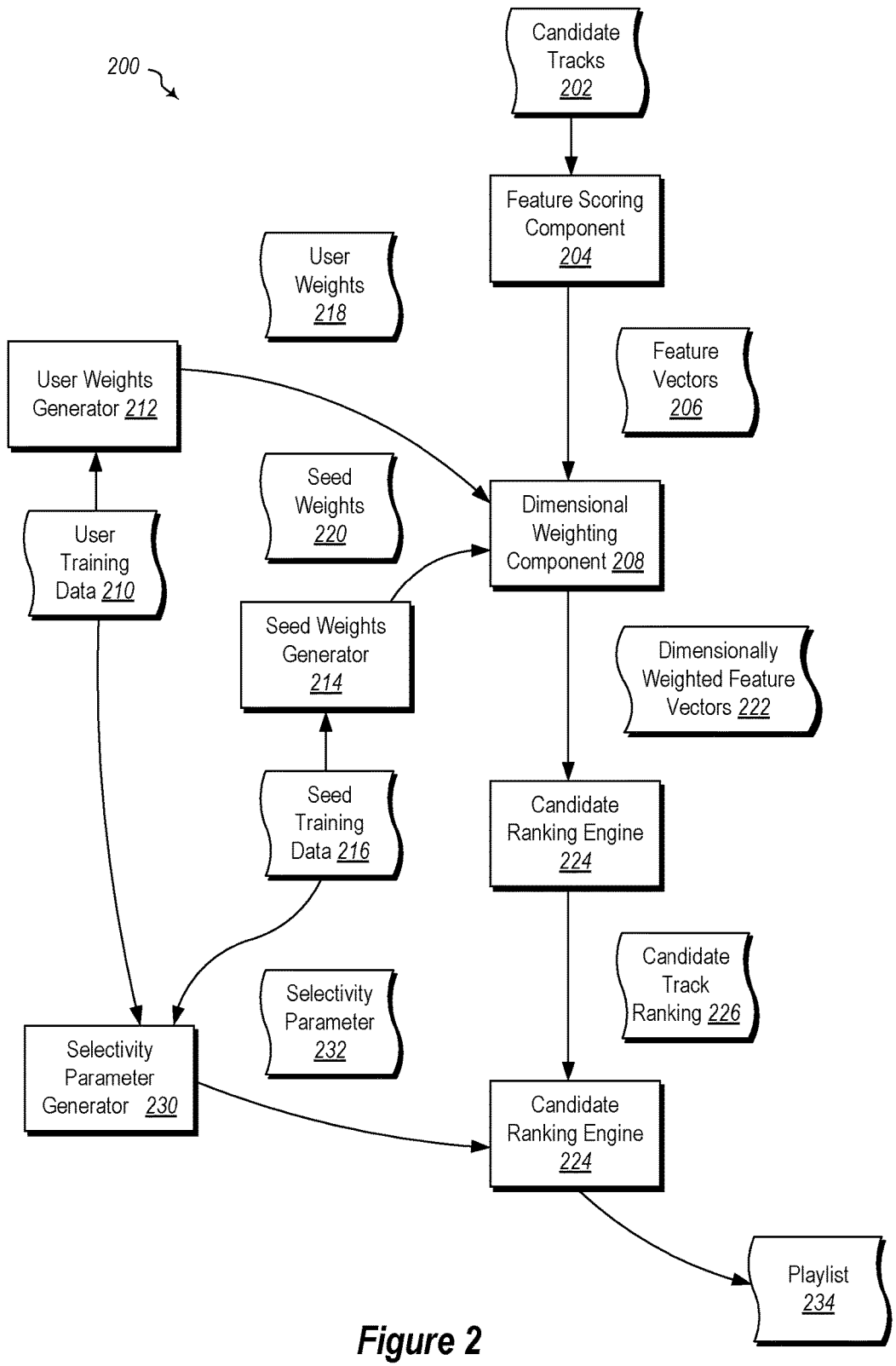
FIG. 2 illustrates an example environment in which the principles describe herein may operate and in which a data structure for controlling a multimedia playlist is generated.

FIG. 2 illustrates a computing system 200 in which the principles and components described herein may operate. The illustrated components may be included in a computing system or computing device structured as described above for the computing system 100 of FIG. 1. The computing system 200 includes a feature scoring component 204 configured to receive a set of candidate tracks 202 and to generate a set of corresponding feature vectors 206. For each candidate track within the set of candidate tracks 202, the feature scoring component 204 is configured to score the candidate track according to one or more separate features to generate a corresponding feature vector with a number of dimensions equal to the number of scored features (e.g., a k-dimensional feature vector where "k" equals the number of scored features).

The set of candidate tracks 202 may include a global list of all available candidate tracks within or obtainable by the computing system 200. Alternatively, the set of candidate tracks 200 may represent a subset, such as a listing of all tracks categorized as a certain genre or sub-genre related to the playlist seed.

Exemplary features by which each of the candidate tracks 202 may be scored include similarity to the playlist seed and/or similarity to a currently playing track, where similarity measures include acoustic similarities and/or historical usage similarities (e.g., based on collaborative filtering of a crowd-based dataset). For example, in an implementation in which the playlist seed is an artist, the feature scoring component 202 may be configured to score each candidate track according to acoustic similarity of the candidate track to the seed artist, acoustic similarity of the candidate track to the currently playing track, acoustic similarity of the candidate track to the artist of the currently playing track, usage similarity of the candidate track to the seed artist, usage similarity of the candidate track to the currently playing track, and/or usage similarity of the candidate track to the artist of the currently playing track.

Additionally, or alternatively, the set of scored features may include candidate track popularity, metadata information (e.g., year of release, record label, mood label of the track or album, etc.), curated expert opinion, user profile information (e.g., age, geographic locale, etc.), and/or artist state or country of origin. One of skill in the art will understand that the particular features described herein are exemplary, and that other scorable features relevant to the ranking of candidate tracks may also be included.

As used herein, the term "usage similarity" and similar terms refer to similarity based on historical patterns of usage. For example, usage data may indicate that, for a given artist, album, or track, playlists will tend to include, at a relatively high rate, another particular artist, album, and/or track. In some embodiments, such usage data includes crowd-sourced data generated by a plurality of users as a result of the compilation of a plurality of different playlists. Such usage data may be referred to herein as "collaborative usage data," "historical usage data," "collaborative/historical listening patterns," and the like.

The illustrated computing system 200 also includes a dimensional weighting component 208 configured to receive the set of feature vectors 206 and to weight each dimension of the feature vectors 206 to generate a set of dimensionally weighted feature vectors 222. As explained in more detail below, the dimensional weighting component 208 is operable to adjust the relative weights of the scored features of the feature vectors 206 based on user-based training data 210 and seed-based training data 216.

As shown, the computing system 200 also includes a seed weights generator 214 configured to receive seed-based training data 216 (or seed training data 216) and to generate seed weights 220. The seed-based training data 216 is based on historical usage/listening patterns of multiple users with respect to the particular playlist seed. For example, the seed-based training data 216 for a particular seed artist may indicate that playlists associated with the artist are more or less sensitive to one or more of the scored features.

In one example, seed-based training data 216 for a seed artist of "Lady Gaga" may indicate that tracks of such playlists are interrelated by usage similarity and popularity more than by acoustic similarity, whereas seed-based training data 216 for a seed artist of "Beethoven" may indicate much more reliance on acoustic similarity features.

The seed weights generator 214 compiles the seed-based training data 216 into a k-dimensional vector within the seed weights 220 to enable seed-based usage weighting of the corresponding feature dimensions of the feature vectors 206 in the dimensional weighting component 208.

As shown, the computing system 200 also includes a user weights generator 212 configured to receive user-based training data 210 (or user training data 210) and to generate corresponding user weights 218. The user-based training data 212 may be based on individual usage patterns specific to a particular user, and may indicate, for example, that a particular user is more or less sensitive to one or more of the scored features. For example, a particular user's usage patterns may indicate that the user is sensitive to features based on acoustic similarity and is relatively insensitive to (i.e., does not care as much about) popularity or features based on usage similarity.

The user weights generator 212 compiles the user-based training data 210 into a k-dimensional vector within the user weights 218 to enable user preference-based weighting of the corresponding feature dimensions of the feature vectors 206 in the dimensional weighting component 208.

In some embodiments, the dimensional weighting component 208 is configured to sum the user weights 218 and the seed weights 220 to generate a combined weighting vector operable to weight the feature vectors 206 based on both historical usage patterns and user preferences. In some embodiments, the dimensionally weighted feature vectors 222 are generated by, for each feature vector, multiplying the value of each dimension of the feature vector with the value of the corresponding dimension of the weighting vector to generate the dimensionally weighted vector as an element-wise product (i.e., Hadamard product).

In some circumstances, such as where a relatively new user is involved, user-based training data 210 may be limited. In such circumstances, dimensional weighting may be performed based on seed-based training data without the use of user weights 218. As more user training data is obtained, it may then be applied to further improve the dimensional weighting.

The illustrated computing system 200 also includes a candidate ranking engine 224 configured to receive the dimensionally weighted feature vectors 222 and to translate the vectors into a candidate track ranking 226. In some embodiments, the candidate ranking engine 224 is operable to convert the weighted feature scores corresponding to each candidate track into probability scores (e.g., through the softmax function or other suitable normalization technique). In some embodiments, the candidate track ranking 226 represents a mapping of the candidate tracks within the k-dimensional feature space corresponding to the scored features.

As shown, the computing system 200 also includes a candidate selection control 228 configured to receive the candidate track ranking 226 and to generate a playlist 234 of one or more tracks by traversing the candidate track ranking 226 to select the one or more tracks of the playlist 234. In some embodiments, the candidate selection control 234 may operate to select candidate tracks by simply always selecting the highest ranked one or more tracks to generate the playlist 234. In other embodiments, such as the illustrated embodiment, the candidate selection control 228 is also configured to apply a selectivity parameter 232 (e.g., a selection model hyper-parameter) to control the manner by which the candidate track ranking 226 is traversed.

For instance, the selectivity parameter 232 may function to control how tightly the candidate selection control 228 follows the candidate track ranking 226, such as by setting a floor and/or ceiling for acceptable probability scores. In one example, the selectivity parameter 232 thereby functions to control candidate track selection according to an exploratory/conservative continuum, where a more exploratory setting enables the selection of candidate tracks having lower probability scores and a more setting aligns more closely to the higher ranking candidate tracks.

In at least some embodiments, the selectivity parameter 232 functions to beneficially balance, on one hand, the ability to offer track diversity and opportunities for new serendipitous discoveries, with, on the other hand, the ability to maintain alignment with a user's intended playlist focus. As shown, the selectivity parameter generator 230 is configured to generate the selectivity parameter 232 based on received user-based training data 210 and/or seed-based training data 216. For example, in the context of generating the selectivity parameter 232, the seed-based training data 216 may indicate that crowd-based usage for a particular seed artist tends to involve a more exploratory setting. At least in some circumstances where sufficient user-based training data 210 exists, the selectivity parameter generator 230 may also apply the user-based training data 210 in generating the selectivity parameter 232. For example, user training data 210 may indicate that a particular user tends to prefer a more conservative selection approach.

As a user interacts with the playlist 234, associated event data may be utilized as training data for improving and/or updating one or more of the user training data 210 or the seed-based training data 216.

Figure 3:
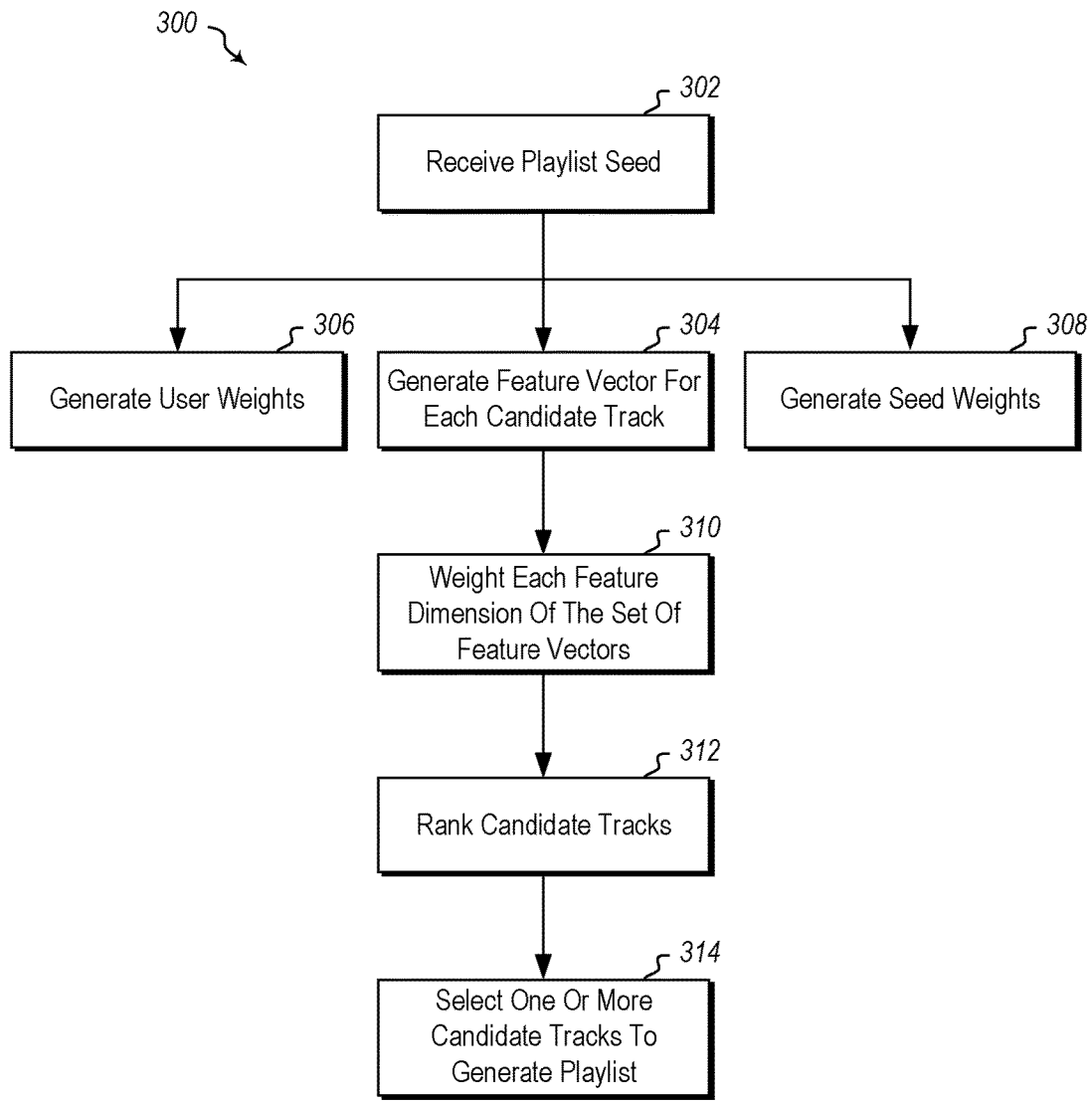
FIG. 3 illustrates a flowchart of a method for generating a multimedia playlist in accordance with the principles described herein.

FIG. 3 illustrates a flowchart of a method 300 for generating a playlist in accordance with the principles described herein. For instance, the method 300 may be performed by the computing system 200 of FIG. 2. The computing system receives a playlist seed (act 302). In a typical implementation, the playlist seed will be an artist selected by the user. Alternatively, the playlist seed may be a specific track, album, or sub-genre, for example. Based on the received playlist seed, a set of candidate tracks are established and the computing system generates a feature vector for each candidate track (act 304). For example, referring to FIG. 2, the feature scoring component 204 receives the set of candidate tracks 202 and generates a corresponding set of feature vectors 206.

The computing system also generates a set of seed weights (act 308), and in circumstances where sufficient user preference data exists, the computing system may also optionally generate a set of user weights (act 306). For instance, referring to FIG. 2, the seed weights generator 214 receives seed training data 216, and based on usage patterns (e.g., crowd-based usage patterns) indicating correlative relationships between the scored features and the playlist seed, generates the seed weights 220. For instance, when the option of using user-based training data is selected, the user weights generator 212 receives user training data 210, and based on user-specific usage patterns indicating a user's relative preferences of the scored features, generates the user weights 218.

The computing system then weights each feature dimension of the set of feature vectors (act 310). For instance, referring to FIG. 2, the dimensional weighting component 208 receives the seed weights 220, the user weights 218 (where sufficient data exists and the option is selected), and the feature vectors 206, and uses the seed weights 220 and the user weights 218 to weight each feature dimension of the feature vectors 206. In some embodiments, as described above, the seed weights 220 and the user weights 218 are summed, and each feature vector is then multiplied with the summed vector to generate the dimensionally weighted feature vectors 222.

The computing system then uses the weighted feature vectors to rank the candidate tracks (act 312), and based on the ranking, selects one or more candidate tracks to generate a playlist (act 314). For instance, referring to FIG. 2, the candidate ranking engine 224 receives the dimensionally weighted feature vectors 222 and generates a candidate track ranking 226. The candidate track ranking 226 may represent a probability score mapping of the set of candidate tracks. The candidate selection control 228 receives the candidate track ranking 226 and generates the playlist 234. In some embodiments, one or more selectivity parameters 232 generated by the selectivity parameter generator 230 are also applied to configure the candidate selection control 228.

Figure 4A:
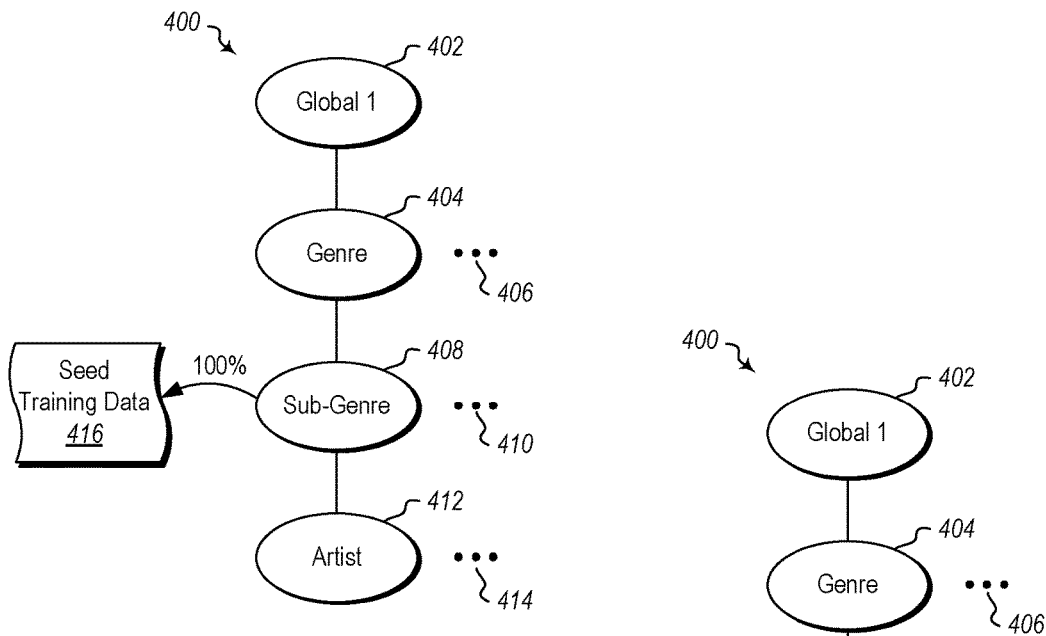
FIGS. 4A-4C illustrate an example environment in which the principles described herein may operate by obtaining seed-based training data according to a multimedia genre hierarchy.
Figure 4B:
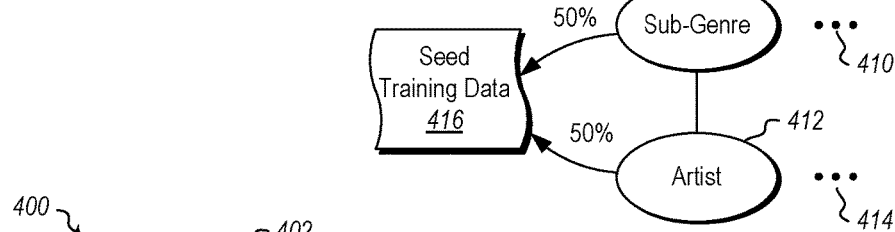
Figure 4C:
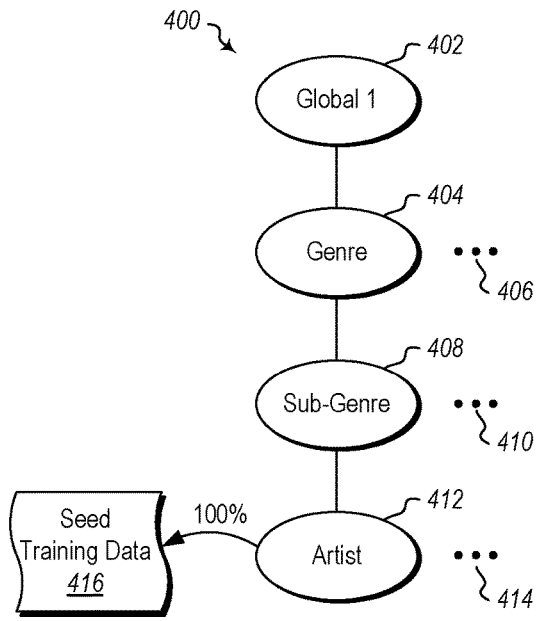

FIGS. 4A-4C illustrate a computing environment configured to provide collaborative usage data 416 according to a genre hierarchy control 400. The environment shown in FIGS. 4A-4C may be utilized to generate the collaborative usage data 216 shown in FIG. 2. As shown, the genre hierarchy control 400 includes multiple hierarchy levels corresponding to a particular playlist seed (artist 412, in this example). The hierarchy control 400 includes a global level 402, a genre level including genre 404 (and multiple additional genres as indicated by ellipses 406), a sub-genre level 408 (and multiple additional sub-genres as indicated by ellipses 408), and an artist level including the seed artist 412 (and multiple additional artists as indicated by ellipses 414). Other embodiments of hierarchy controls may include different level configurations, and/or may include additional hierarchy levels, such as album and track levels.

For instance, where a particular playlist seed has insufficient information, the hierarchy engine 400 is operable to make use of information associated with higher levels of the hierarchy. Each of these higher levels function as information priors which aggregate and share the observed data collected from all of its child parameters. For example, a sub-genre prior aggregates and shares the observed information collected from all of its child artists, a genre prior aggregates and shares the observed information collected from all of its child sub-genres, and a root prior aggregates and shares the observed information collected from all of its child genres. Thus, although prior information may be somewhat less granular than a seed parameter, it is beneficial in circumstances where insufficient information is available for a particular seed parameter. As described herein, a seed parameter may be initialized with information coming from a prior. Then, as more data is observed, the particular seed parameters can shift away from the prior in order to improve granularity and accuracy.

In the example shown in FIG. 4A, the particular seed artist 412 lacks sufficient usage history to function as a source for the seed-based training data 416 (or seed training data 416). This may be, for example, that the artist 412 is relatively new or has relatively less exposure. In this circumstance, the hierarchy control 400 traverses to higher levels until reaching a level having sufficient historical usage information to generate the seed training data 416. As shown in FIG. 4A, this is achieved by traversing to the hierarchy level immediately above the artist level. In this example, because the sub-genre 408 had sufficient usage history, the hierarchy control 400 generates the seed training data 416 by sourcing "100%" from the historical usage information of the sub-genre 408. In other implementations, the hierarchy control 400 may traverse to even higher levels. For example, if sub-genre 408 also failed to have a sufficient amount of associated usage information, the hierarchy control 400 would traverse further upward to genre 404.

As time progresses, more usage information related to the seed artist 412 may be gathered. In some embodiments, the hierarchy control 400 is configured to use a progressively greater proportion of lower level usage information as the lower level usage information is obtained. FIG. 4B illustrates that as more usage information related to the seed artist 412 has been obtained (e.g., in the form of crowd-based usage data), "50%" of the seed training data 416 is sourced from usage data of the seed artist 412. FIG. 4C shows that as even more usage data related to the seed artist 412 is gathered, the hierarchy control is able to generate the seed training data 416 based "100%" on the usage data related to the seed artist 412.

Figure 5:
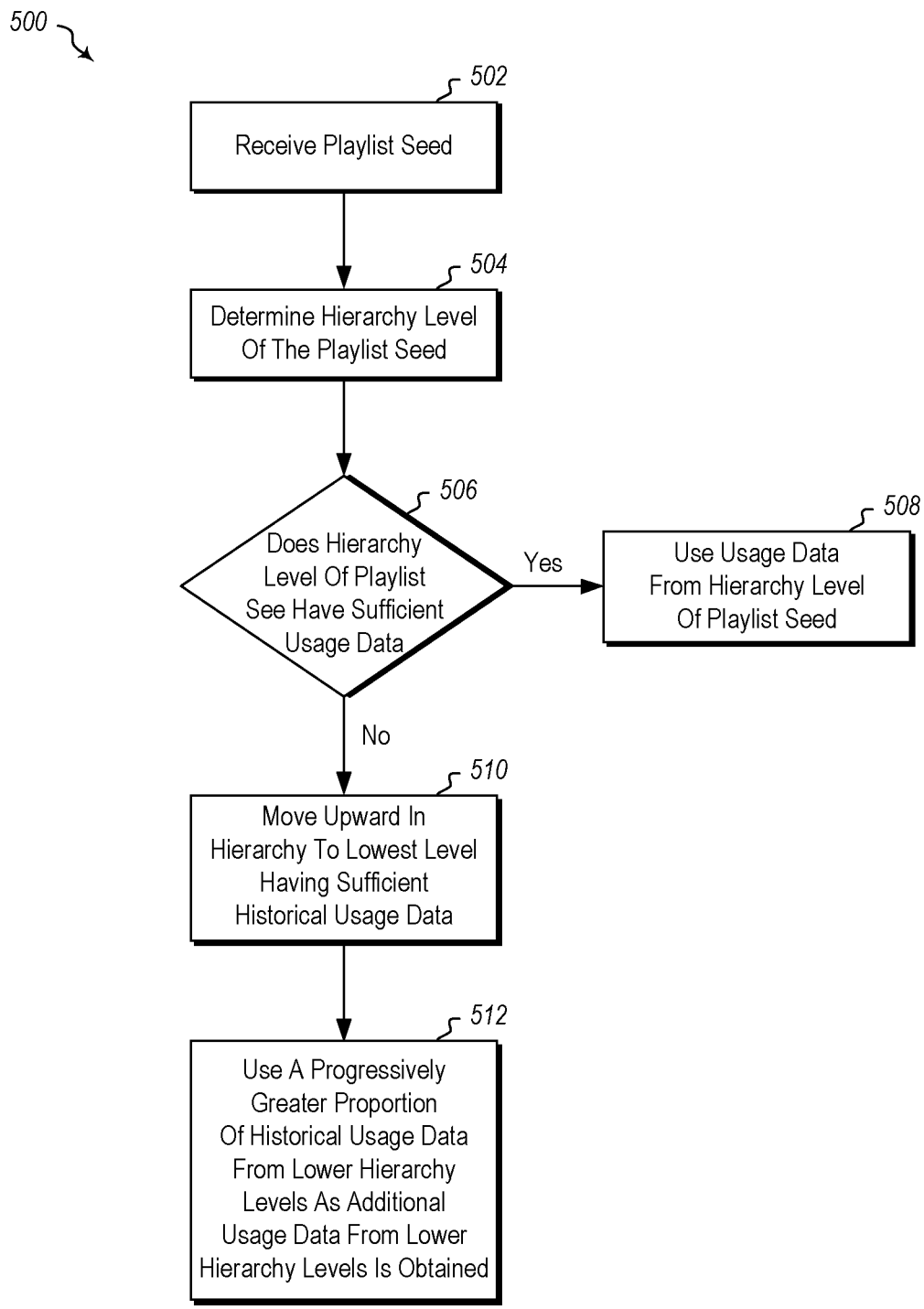
FIG. 5 illustrates a flowchart of a method for obtaining seed-based training data according to a multimedia genre hierarchy in accordance with the principles described herein.

FIG. 5 illustrates a flowchart of a method 500 for generating collaborative usage data in accordance with the principles described herein. For instance, the method 500 may be performed by the hierarchy control 400 of FIGS. 4A-4C. A computing system receives a playlist seed (act 502), and determines a hierarchy level of the playlist seed (act 504). For instance, referring to FIGS. 4A-4C, the hierarchy control 400 receives a playlist seed in the form of the seed artist 412, and determines that the seed artist 412 is in the artist hierarchy level.

The computing system then determines whether the hierarchy level of the playlist seed has sufficient usage data (act 506). Where it is determined that a sufficient amount exists, the computing system then uses seed training data from the hierarchy level of the playlist seed (act 508). Where it is determined that insufficient usage data exists, the computing system then moves upward in the hierarchy to the lowest hierarchy level having sufficient usage data (act 510).

For instance, referring to FIGS. 4A-4C, the hierarchy control 400 determines whether a sufficient amount of usage data related to the seed artist 412 exists. Where it is determined that the amount of usage data is insufficient, the hierarchy control 400 utilizes usage data from higher levels, such as by using the usage data associated with sub-genre 408, as shown in FIG. 4A. Where it is determined that the amount of usage data is sufficient, the hierarchy control 400 utilizes the usage data associated with the seed artist 412 to formulate the training data, as shown in FIG. 4C.

Referring again to FIG. 5, where it was first determined that insufficient usage data existed at the level of the playlist seed, the computing system may subsequently use progressively greater proportions of usage data from lower hierarchy levels as additional usage data from the lower hierarchy levels is obtained (act 512). For instance, referring to FIGS. 4A-4C, as more usage data is obtained related to seed artist 412, a greater proportion of the seed training data 416 may be sourced from the level of the seed artist 412, as indicated by the transition from FIG. 4A to FIG. 4B and then to FIG. 4C.

Figure 6A:
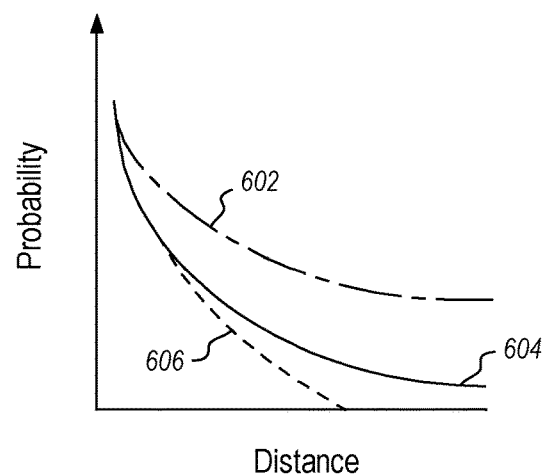
FIGS. 6A-6B illustrate an example of a multimedia selection process including selecting the ranked elements according to an applied selectivity parameter.
Figure 6B:
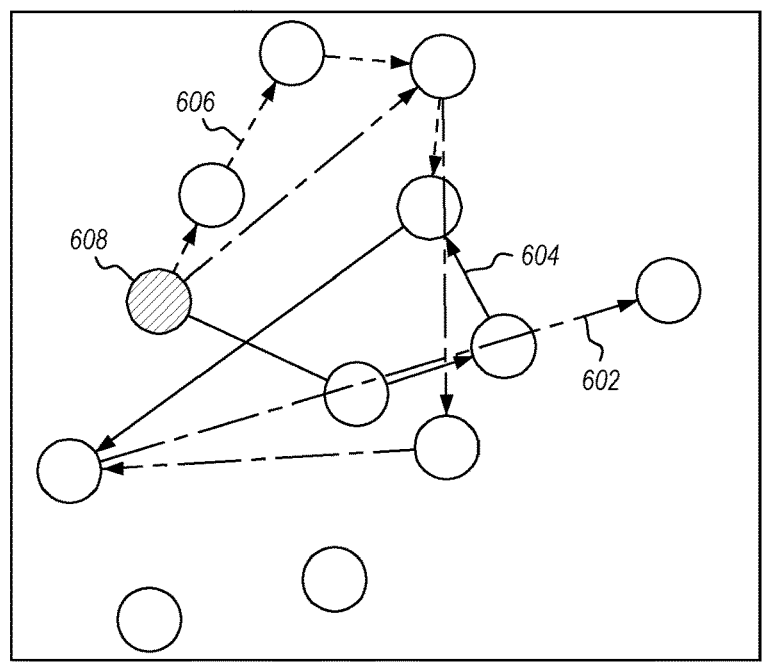

FIGS. 6A and 6B graphically illustrate selection of ranked candidate tracks in the context of one or more applied selectivity parameters. For example, the functionality illustrated in FIGS. 6A and 6B may be utilized by the candidate selection control 228 of FIG. 2, as influenced by one or more applied selectivity parameters 232 of FIG. 2.

FIG. 6A graphically illustrates the candidate track selection probability distributions of various exemplary selectivity states 602, 604, and 606, where selection probability is shown on the vertical axis and distance from the currently playing track (or seed track) within an n-dimensional feature space is shown on the horizontal axis (i.e., lower ranked candidate tracks are more distant and toward the right). As shown in FIG. 6A, the selectivity state 602 represents a more relaxed/exploratory selectivity state, where the probability of selection remains relatively high as candidate track position extends farther away from the origin track (e.g., the currently playing track or playlist seed). In contrast, the selectivity state 604 represents a somewhat stricter selectivity state, where the probabilities are somewhat higher for candidate tracks positioned/scored closer to the origin track and drop faster for more distant candidate tracks. Selectivity state 606 represents an even stricter selectivity state, maintaining tighter adherence to candidate tracks positioned/scored close to the origin track.

FIG. 6B illustrates another view of a candidate track selection process according to various selectivity states. As shown, from the position of an origin track 608, the selection path 602 traverses the candidate track space with more frequent visits to more distant candidate tracks, while the more conservative selection path 604 tends to transition to relatively more closely positioned tracks, and the selection path 606 always moves to the closest neighbor track.

The following exemplary embodiment illustrates one particular non-limiting manner in which the principles described herein may be carried out. A multivariate Bayesian linear regression algorithm with conjugate Gaussian priors may be used to learn the following model:

$$p(W \mid X, t) = \prod_{n=1}^{N} \frac{\mathcal{N}(t_n; (w_a + w_u)^T x_n, \beta^{-1})}{p(t \mid X)} \times$$

$$\prod_{u=1}^{U} \mathcal{N}(w_u; 0, \alpha_u^{-1} I) \times \prod_{a=1}^{A} \mathcal{N}(w_a; w_s, \alpha_a^{-1} I) \times$$

-continued $$\prod_{s=1}^{S} \mathcal{N}(w_s; w_g, \alpha_s^{-1}I) \times \prod_{g=1}^{G} \mathcal{N}(w_g; w, \alpha_g^{-1}I) \times \mathcal{N}(w; 0, \alpha^{-1}I)$$

where W, X, t are the model parameters, dataset, and labels, accordingly. n, u∈U, a∈A, s∈S, g∈G are the samples, users, artists, sub-genres, and genres, accordingly. $x_n \in R^K$ is the K dimensional feature vector for a candidate track. $w_u$, $w_a$, $w_s$, $w_g$, w∈$R^K$ are all of the learnt model parameters per user, artist, the artist's subgenre, the artist's genre and a global/whole catalog. β, $\alpha_u$, $\alpha_a$, $\alpha_s$, $\alpha_g$, α are the prior noise precision hyper-parameters for the prediction, user, artist, subgenre, genre, and global, accordingly. These model hyper-parameters can be replaced by a conjugate Inverse-Gamma prior which are replaced with parameters which have a lower impact on model quality.

A learning scheme, such as a Variational Bayes factorized approximation, may be employed to find the parameters which maximize the likelihood of the posterior distribution of our model given the data. The model may factorize to alternating regression updates on the parameters. Once trained, inference is performed by computing the point estimate on the probability density for the candidate track and the user:

$$p(t_n | x_n, w_a, w_u) = E[N(t_n; (w_a + w_u)^T x_n, \beta^{-1})] = (w_a + w_u)^T x_n$$

The resulting probability is used to rank candidates, and a sample is taken from the corresponding softmax-squashed probability distribution. This sample denotes the next track to be played, and the process continues until a desired playlist length is generated. Since this process can be described in terms of a decision process where the next tracks are the states, arbitrary heuristic decision mechanisms may be introduced, such as a mechanism to regulate the number of tracks from a specific artist. These mechanisms can be controlled with hyper-parameters to generate different exploration behaviors on the track space as desired, and provide different user experiences on top of the same relevance based model, catering to both "adventurous" and "conservative" users, for example.

The present invention may be embodied in other forms, without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a computing system for generating a playlist, the method comprising:
   the computing system receiving a playlist seed;
   the computing system generating a feature vector for each of a plurality of candidate tracks, each feature vector having one or more features each corresponding to respective feature dimensions;
   the computing system, for each feature vector, adjusting the weight of at least one feature of the feature vector to form a dimensionally weighted feature vector, the adjustment being performed according to training data corresponding to the playlist seed, wherein the training data corresponding to the playlist seed is configured according to a genre hierarchy having a plurality of hierarchy levels, the training data being based on historical usage data of a lowest hierarchy level within which the playlist seeds resides and from which there is sufficient historical usage data;
   the computing system ranking the plurality of candidate tracks according to the dimensionally weighted feature vectors of the plurality of candidate tracks to form a candidate track ranking; and
   the computing system selecting one or more tracks according to the candidate track ranking to generate a playlist.

2. The method of claim 1, wherein adjusting the weight of at least one feature of each feature vector further includes adjusting according to training data further associated with individual user activity.

3. The method of claim 2, wherein the training data associated with individual user activity represents a set of corrective weighting factors for tailoring the relative weights of the features of the feature vectors according to historical listening patterns of a corresponding user.

4. The method of claim 2, wherein the computer-executable instructions are also structured to cause the computing system to track user activity with respect to the generated playlist to generate additional training data for updating one or more of the training data associated with the playlist seed or the training data associated with individual user activity.

5. The method of claim 1, wherein each feature vector includes a plurality of features.

6. The method of claim 5, wherein the plurality of features of a corresponding candidate track include one or more features indicating acoustic similarity between one or more of the candidate track, an artist of the candidate track, or an album of the candidate track to one or more of a previously played track, an artist of a previously played track, an album of a previously played track, or the playlist seed.

7. The method of claim 5, wherein the plurality of features of a corresponding candidate track include one or more features indicating crowd-sourced usage similarity between one or more of the candidate track, an artist of the candidate track, or an album of the candidate track to one or more of a previously played track, an artist of a previously played track, an album of a previously played track, or the playlist seed.

8. The method of claim 5, wherein the plurality of features of a corresponding candidate track include one or more features indicating popularity of the candidate track.

9. The method of claim 1, wherein the training data associated with the playlist seed represents a set of corrective weighting factors for tailoring the relative weights of the features of the feature vectors according to historical listening patterns of a plurality of users with respect to the playlist seed.

10. The method of claim 1, wherein the playlist seed is an artist.

11. The method of claim 1, wherein the training data associated with the playlist seed is configured according to the genre hierarchy such that as additional usage data is received at one or more hierarchy levels lower than a current hierarchy level source, a progressively greater proportion of the training data is based on the additional usage data added to the relatively lower hierarchy level.

12. The method of claim 1, wherein selecting one or more tracks according to the candidate track ranking includes selecting one or more tracks according to one or more selectivity parameters, the one or more selectivity parameters controlling a strictness factor by which track selection probabilities align with the candidate track ranking.

13. A computing system configured for generating a playlist, the computing system comprising:

one or more processors;

one or more computer-readable media having thereon computer-executable instructions that are structured such that, when executed by the one or more processors, cause the computing system to perform at least the following in response to receiving a playlist seed:

generate a feature vector for each of a plurality of candidate tracks, each feature vector having one or more features each corresponding to respective feature dimensions;

for each feature vector, adjust the weight of at least one feature of the feature vector to form a dimensionally weighted feature vector, the adjustment being performed according to training data corresponding to the playlist seed, the training data being based on historical usage data of a genre hierarchy according to a lowest hierarchy level within which the playlist seed resides and from which there is sufficient historical usage data;

rank the plurality of candidate tracks according to the dimensionally weighted feature vectors of the plurality of candidate tracks to form a candidate track ranking; and select one or more tracks according to the candidate track ranking to generate a playlist.

14. The computing system of claim 13, wherein the training data is configured according to the genre hierarchy such that as additional usage data is received at one or more hierarchy levels lower than a current hierarchy level source, a progressively greater proportion of the training data is based on the additional usage data added to the relatively lower hierarchy level.

15. The computing system of claim 13, wherein the adjustments to form the dimensionally weighted feature vectors are also performed according to training data associated with individual user activity.

16. The computing system of claim 15, wherein selecting one or more tracks according to the candidate track ranking includes selecting one or more tracks according to one or more selectivity parameters, the one or more selectivity parameters controlling a strictness factor by which track selection probabilities align with the candidate track ranking.

17. A computer program product comprising one or more hardware storage devices having stored computer-executable instructions which are executable by one or more processors of a computing system for causing the computing system to perform the following in response to the computing system receiving a playlist seed:

generate a feature vector for each of a plurality of candidate tracks, each feature vector having one or more features each corresponding to respective feature dimensions;

for each feature vector, adjust the weight of at least one feature of the feature vector to form a dimensionally weighted feature vector, the adjustment being performed according to training data corresponding to the playlist seed, the training data being based on historical usage data of a genre hierarchy according to a lowest hierarchy level within which the playlist seed resides and from which there is sufficient historical usage data;

rank the plurality of candidate tracks according to the dimensionally weighted feature vectors of the plurality of candidate tracks to form a candidate track ranking; and select one or more tracks according to the candidate track ranking to generate a playlist.

18. The computer program product of claim 17, wherein at least one of the one or more selectivity parameters is tunable according to an exploratory/conservative scale.

19. The computer program product of claim 17, wherein the adjustments to form the dimensionally weighted feature vectors are also performed according to detected training data associated with individual user activity.

* * * * *